(12) United States Patent
Takeichi

(10) Patent No.: US 9,202,148 B2
(45) Date of Patent: Dec. 1, 2015

(54) IMAGE PROCESSING APPARATUS AND METHOD FOR GENERATING STENCIL DATA OF A STROKE BASED ON SHAPE INFORMATION, CONNECTION-POINT INFORMATION, AND END-POINT INFORMATION

(71) Applicant: CANON KABUSHIKI KAISHA, Tokyo (JP)

(72) Inventor: Shinya Takeichi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/340,866

(22) Filed: Jul. 25, 2014

(65) Prior Publication Data

US 2015/0062600 A1  Mar. 5, 2015

(30) Foreign Application Priority Data

Aug. 27, 2013 (JP) .................................. 2013-176076
May 7, 2014 (JP) .................................. 2014-096225

(51) Int. Cl.
*G06K 1/00* (2006.01)
*G06K 15/02* (2006.01)

(52) U.S. Cl.
CPC .................................... *G06K 15/027* (2013.01)

(58) Field of Classification Search
None
See application file for complete search history.

(56) References Cited

U.S. PATENT DOCUMENTS

| | | | | |
|---|---|---|---|---|
| 6,542,161 | B1 * | 4/2003 | Koyama et al. | 345/589 |
| 7,301,672 | B2 * | 11/2007 | Abe et al. | 358/1.9 |
| 8,581,948 | B2 * | 11/2013 | Hasegawa | 347/217 |
| 8,717,624 | B2 * | 5/2014 | Katayama et al. | 358/1.9 |
| 9,064,340 | B2 * | 6/2015 | Kokojima | 1/1 |

FOREIGN PATENT DOCUMENTS

| | | |
|---|---|---|
| JP | 06-168339 A | 6/1994 |
| JP | 11-15985 A | 1/1999 |

* cited by examiner

*Primary Examiner* — Steven Kau
(74) *Attorney, Agent, or Firm* — Fitzpatrick, Cella, Harper & Scinto

(57) ABSTRACT

An image processing apparatus renders a stroke formed by paths. A first obtaining unit obtains shape information representing a shape of a path, a second obtaining unit obtains end-point information representing a modification method for an end point, and a third obtaining unit obtains line-width information representing a line-width of the stroke. A generation unit generates stencil data of the stroke based on the shape, the line-width, and the end-point information. The generation unit includes a first generator to generate basic stencil data by fattening the path represented by the shape information based on the line-width information, and a second generator to generate end-point stencil data based on the end-point information. The generation unit merges the end-point stencil data into the basic stencil data in generating the stencil data. The end-point information represents one of a butt, a square, and a round as the modification method for the end point.

19 Claims, 12 Drawing Sheets

F I G. 4

| | |
|---|---|
| MOVE(x, y) | CURRENT COORDINATES (x0, y0) ARE SET IN (x, y) AND USED AS START POINT OF PATH |
| LINE(x, y) | LINE SEGMENT IS DRAWN FROM CURRENT COORDINATES (x0, y0) TO (x, y), AND CURRENT COORDINATES ARE SET IN (x, y) |
| QBEZIER(x1, y1, x, y) | QUADRATIC BEZIER CURVE IS DRAWN FROM CURRENT COORDINATES (x0, y0) TO (x, y) THROUGH (X, Y) SATISFYING EQUATION BELOW, AND CURRENT COORDINATES ARE SET IN (x, y) <br> $(X, Y)^T = (1-t)^2 (x0, y0)^T + 2t(1-t)(x1, y1)^T + t^2 (x, y)^T \quad (0 \leq t \leq 1)^{(*)}$ |
| CBEZIER(x1, y1, x2, y2, x, y) | CUBIC BEZIER CURVE IS DRAWN FROM CURRENT COORDINATES (x0, y0) TO (x, y) THROUGH (X, Y) SATISFYING EQUATION BELOW, AND CURRENT COORDINATES ARE SET IN (x, y) <br> $(X, Y)^T = (1-t)^3 (x0, y0)^T + 3t(1-t)^2 (x1, y1)^T + 3t^2 (1-t)(x2, y2)^T + t^3 (x, y)^T \quad (0 \leq t \leq 1)^{(*)}$ |
| CLOSE() | LINE SEGMENT IS DRAWN FROM CURRENT COORDINATES (x0, y0) TO START POINT OF PATH, AND CURRENT COORDINATES ARE SET AT START POINT |

$(*)$ T OF $(x, y)^T$ REPRESENTS TRANSPOSED MATRIX

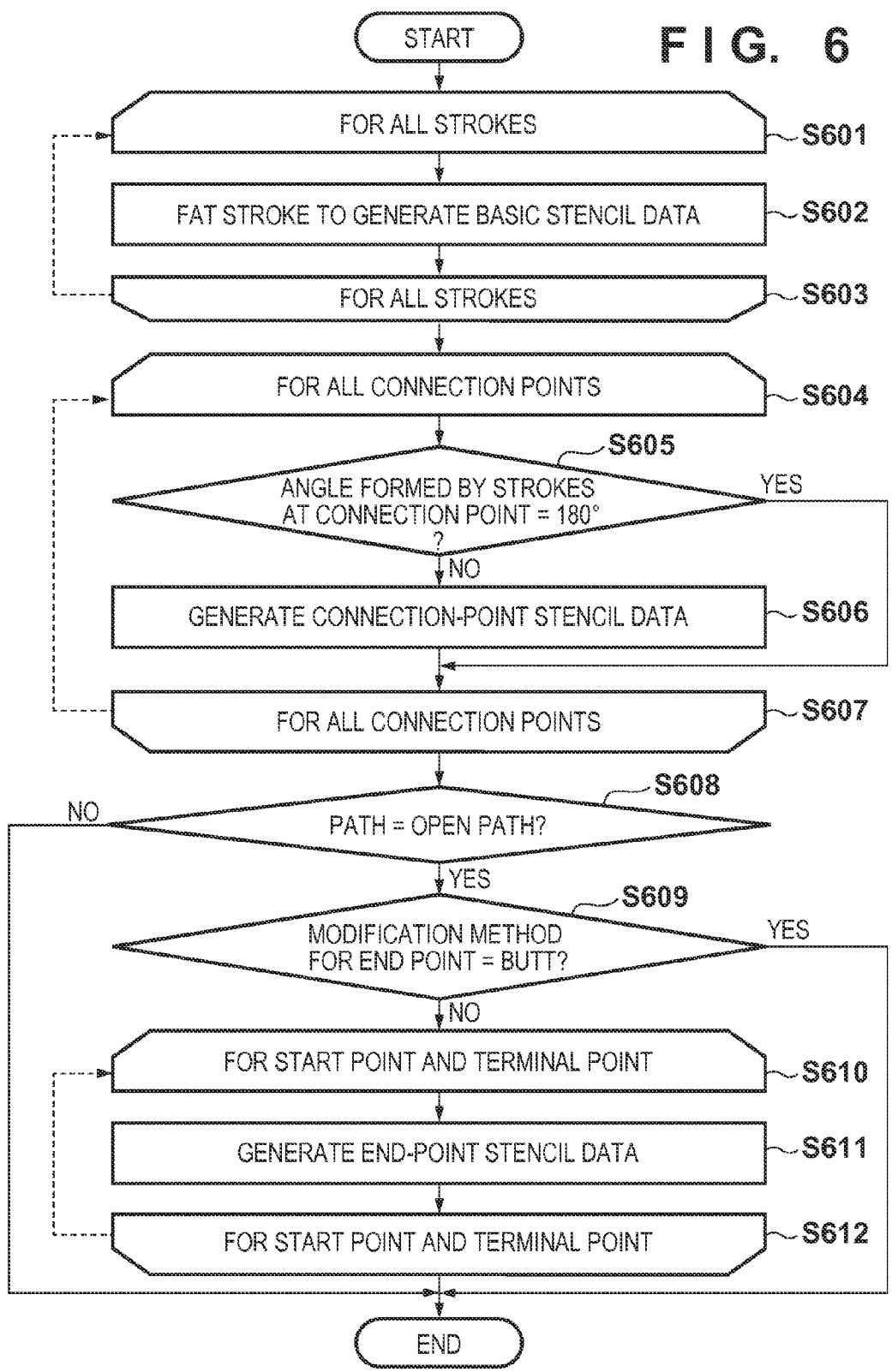

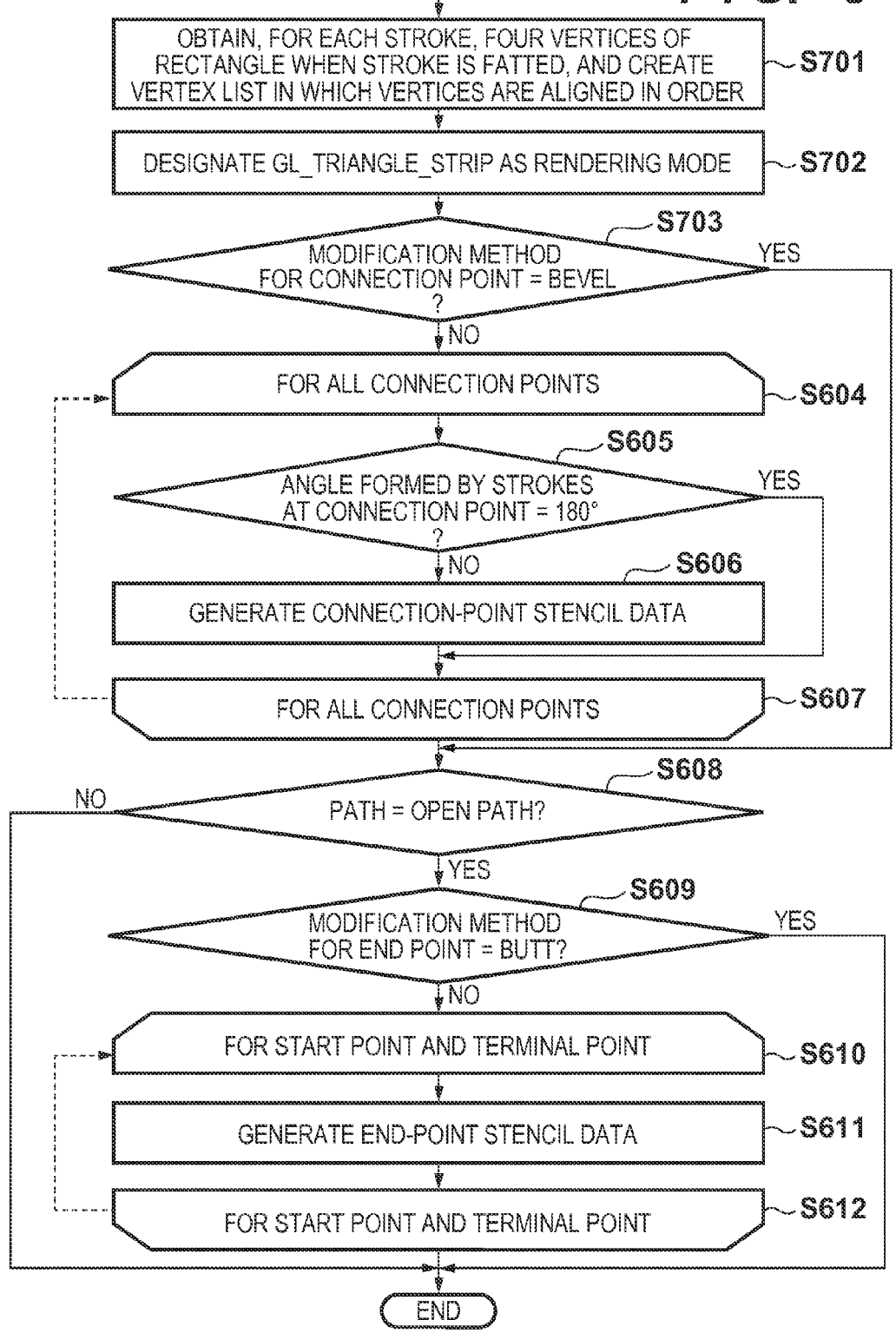

FIG. 11A
| MOVE(50, 50) |
| LINE(100, 200) |
| LINE(150, 50) |
FIG. 11B
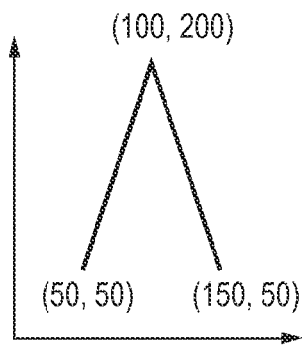
FIG. 11C
| MOVE(50, 50) |
| LINE(50, 100) |
| CBEZIER(50, 150, 150, 150, 150, 100) |
| LINE(200, 50) |
FIG. 11D
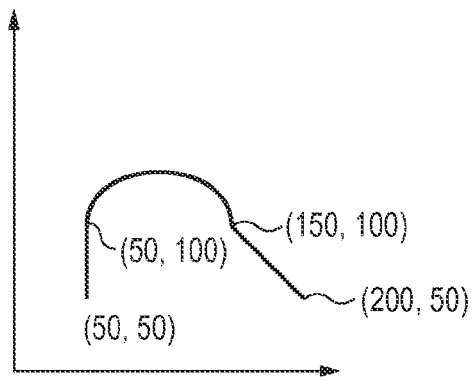
FIG. 11E
| MOVE(50, 50) |
| LINE(100, 100) |
| LINE(150, 50) |
| CLOSE() |
FIG. 11F
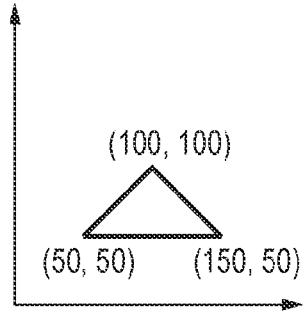

FIG. 13A
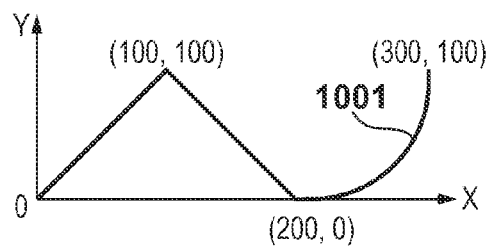
FIG. 13B
| MOVE(0, 0) |
| LINE(100, 100) |
| LINE(200, 0) |
| CBEZIER(200, 0, 300, 40, 300, 100) |
FIG. 13C
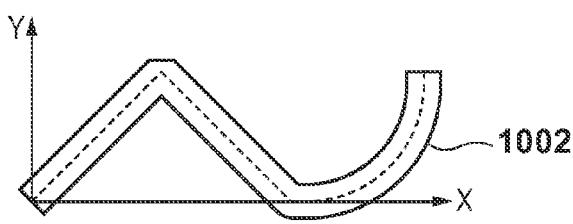
FIG. 13D
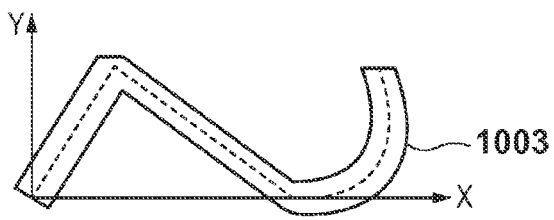
FIG. 13E
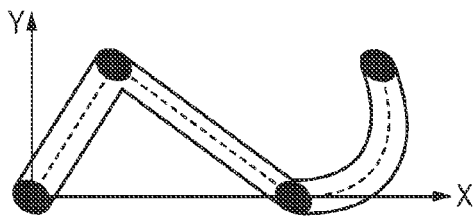

IMAGE PROCESSING APPARATUS AND METHOD FOR GENERATING STENCIL DATA OF A STROKE BASED ON SHAPE INFORMATION, CONNECTION-POINT INFORMATION, AND END-POINT INFORMATION

CLAIM OF PRIORITY

This application claims the benefit of Japanese Patent Application No. 2013-176076, filed Aug. 27, 2013, and No. 2014-096225, filed May 7, 2014, which are hereby incorporated by reference herein in their entirety.

BACKGROUND OF THE INVENTION

1. Field of the Invention

The present invention relates to image processing of rendering a stroke formed by a plurality of continuative paths.

2. Description of the Related Art

Generally, when rendering a stroke having a line width, a round type, a bevel type, or a miter type is used as a modification method of filling a gap at a connection point. A round type, a square type, or a butt type is used as a modification method for a start point and a terminal point serving as the end points of a stroke.

Japanese Patent Laid-Open No. 06-168339 discloses a method of generating a figure at a gap and performing fill processing in order to fill the gap at a connection point. Japanese Patent Laid-Open No. 11-015985 discloses a method of slightly superimposing and rendering two strokes sharing a connection point, and a figure filling a gap at the connection point, so as not to generate a gap between them owing to a calculation error.

The gap shape changes, however, depending on the connection point. According to the above-described methods, a figure for filling a gap needs to be generated for each connection point. When rendering a path having many connection points, the calculation cost rises. If many figures for small gaps are generated and held, the memory utilization increases.

SUMMARY OF THE INVENTION

In one aspect of the invention, an image processing apparatus for rendering a stroke formed by a plurality of continuative paths, comprises a first obtaining unit configured to obtain shape information representing a shape of a path, a second obtaining unit configured to obtain end-point information representing a modification method for an end point of the stroke, a third obtaining unit configured to obtain connection-point information representing a modification method for a connection point of the stroke, and a generation unit configured to generate stencil data of the stroke based on the shape information, the connection-point information, and the end-point information.

According to the one aspect, when rendering a stroke formed by a plurality of continuative paths, a stroke having a modified connection point and an end point can be rendered quickly.

Further features of the present invention will become apparent from the following description of exemplary embodiments with reference to the attached drawings.

BRIEF DESCRIPTION OF THE DRAWINGS

FIG. 4 is a table showing an example of path commands and processing contents.

FIG. 6 is a flowchart for explaining a stencil data creation method.

FIG. 8 is a flowchart for explaining another generation method of generating stencil data.

FIGS. 11A to 11F are views for explaining the relationship between a path command example and a stroke.

FIGS. 13A to 13E are views for explaining processing of generating stencil data of a stroke accompanied by two-dimensional affine transformation.

DESCRIPTION OF THE EMBODIMENTS

Vector graphics rendering as image processing according to an embodiment of the present invention will now be described in detail with reference to the accompanying drawings. Note that the embodiment is not intended to limit the present invention to the scope of the appended claims, and not all combinations of arrangements described in the following embodiment are indispensable for the means to solve the problems according to the present invention.

[Apparatus Arrangement]

The arrangement of a computer apparatus 101 that implements an image processing apparatus for executing vector graphics rendering processing according to the embodiment will be explained with reference to the block diagram of FIG. 1.

Figure 1:
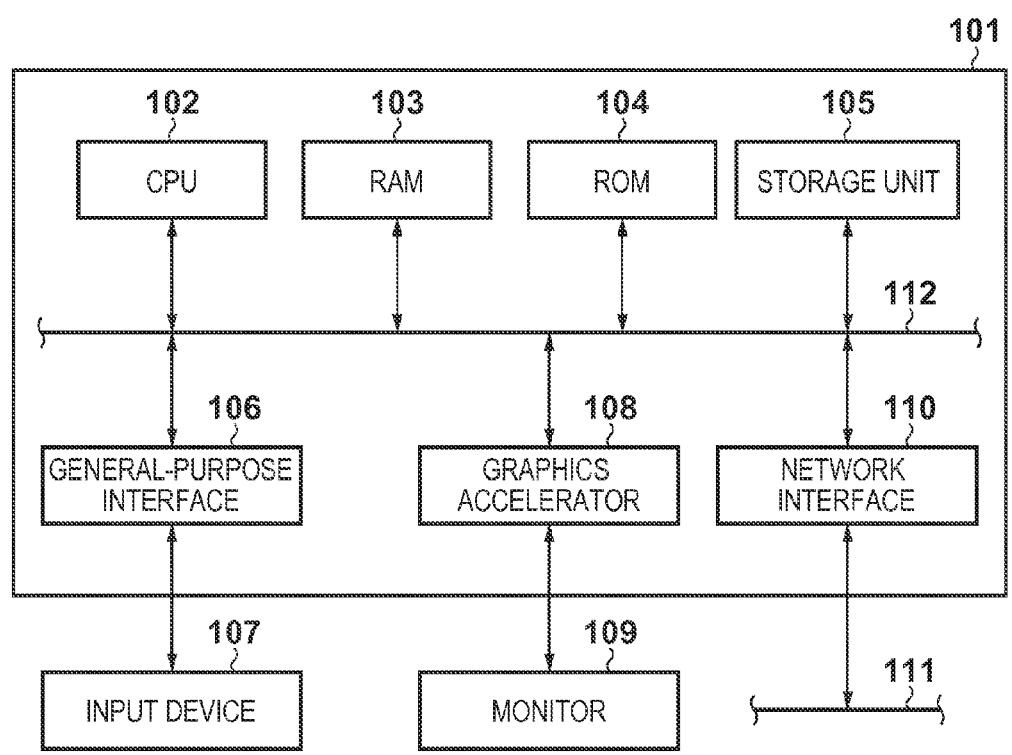
FIG. 1 is a block diagram for explaining the arrangement of a computer apparatus that executes vector graphics rendering processing according to an embodiment.

Referring to FIG. 1, a microprocessor as a central processing unit (CPU) 102 executes an operating system (OS) and various programs stored in a read only memory (ROM) 104 and a storage unit 105 by using a random access memory (RAM) 103 as a work memory, and controls an arrangement (to be described later) via a system bus 112.

A graphics accelerator 108 includes a video interface such as HDMI® or DisplayPort™, and displays graphics and a user interface (UI) on a connected monitor 109. A general-purpose interface (I/F) 106 is, for example, a USB (Universal Serial Bus) interface, and an input device 107, such as a keyboard or a mouse, is connected to the general-purpose I/F 106. A network I/F 110 is connected to a wired or wireless network 111.

The storage unit 105 is, for example, a hard disk drive (HDD) or a solid state disk (SSD), and stores various programs and various parameters including a program for vector graphics rendering processing according to the embodiment. The storage unit 105 may be a recording medium such as a USB memory connectable to the general-purpose I/F 106, or a memory card readable/writable through a card reader connected to the general-purpose I/F 106. The storage unit 105 may be a network device connected to the network I/F 110 through the network 111.

When the computer apparatus 101 is, for example, a tablet device, the monitor 109 including a touch panel equivalent to the input device 107 is integrated with the computer apparatus 101.

When vector graphics rendering is designated through the UI and input device 107, the CPU 102 activates the program for vector graphics rendering processing, and executes vector graphics rendering processing to render a stroke that is formed by a plurality of continuative paths and has a predetermined line width.

[Vector Graphics Rendering Processing]

The processing arrangement of the image processing apparatus in vector graphics rendering processing will be explained with reference to the block diagram of FIG. 2. Vector graphics rendering processing will be explained with reference to the flowchart of FIG. 3. Note that FIG. 3 shows processing for one path.

A path shape obtaining unit 201 obtains, from the RAM 103, information (to be referred to as "shape information" hereafter) representing the shape of a path (S301). The shape information of the path includes information in which a plurality of pairs each of a path command and a coordinate value are aligned in the designation order.

FIG. 4 shows an example of path commands and processing contents. As shown in FIG. 4, the number of required coordinate values changes depending on the path command. General path commands include rendering commands for a circular arc, a horizontal line, a vertical line, and the like, in addition to the commands shown in FIG. 4, but a description thereof will not be repeated.

The relationship, between a stroke and a path command example included in shape information of a path that is obtained by the path shape obtaining unit 201, will be explained with reference to FIGS. 11A to 11F. For example, when path commands shown in FIG. 11A are rendered in the X-Y orthogonal coordinate system at a line width >0, a stroke shown in FIG. 11B is obtained.

Then, a line-width information obtaining unit 202 obtains, from the RAM 103, information (to be referred to as "line-width information" hereafter) representing the line width of a stroke corresponding to the path (S302), and determines whether the line width is 0 (S303). If the line width is 0, the stroke need not be rendered, and the processing for one path ends. If no line-width information is stored in the RAM 103, the line-width information obtaining unit 202 obtains line-width information of an initial value from the storage unit 105, or the like.

If the line width >0, a color information obtaining unit 205 obtains, from the RAM 103, information (to be referred to as "color information" hereafter) representing the color of the stroke corresponding to the path (S304), and determines whether the transparency included in the color information indicates transparence (S305). If the transparency indicates transparence, the stroke need not be rendered, and the processing for one path ends. If no color information is stored in the RAM 103, the color information obtaining unit 205 obtains color information of an initial value from the storage unit 105, or the like.

If the transparency does not indicate transparence, an end-point information obtaining unit 203 obtains, from the RAM 103, information (to be referred to as "end-point information" hereafter) representing a stroke modification method at the start point and the terminal point of the path (S306). If no end-point information is stored in the RAM 103, the end-point information obtaining unit 203 obtains end-point information of an initial value from the storage unit 105, or the like.

Figure 5A:
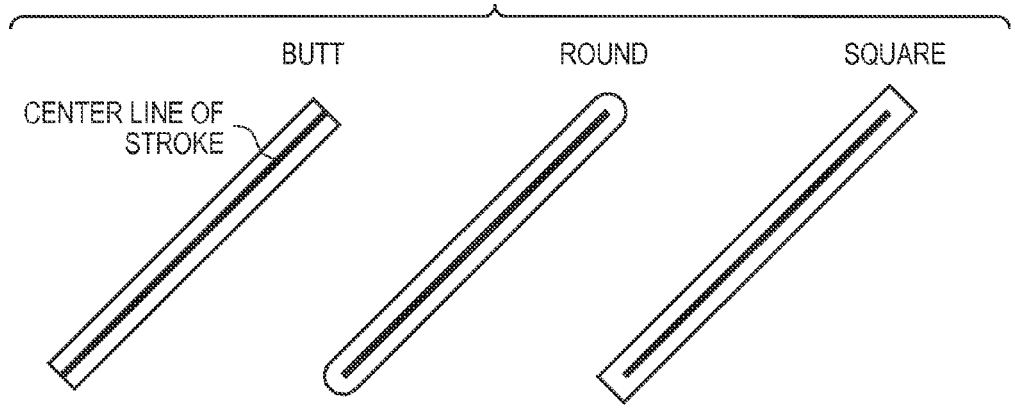
FIGS. 5A to 5C are views for explaining the type of modification method.

The type of modification method will be explained with reference to FIGS. 5A to 5C. FIG. 5A shows modification methods for an end point. "Butt" is processing of modifying an end point to be flat in a direction orthogonal to the direction of the stroke. "Round" is processing of modifying an end point by a semi-circular arc that has the line width as the diameter and the end point of a stroke as the center. "Square" is processing of extending an end point in the direction of a stroke by a length corresponding to half the line width.

As for the modification method for an end point, different modification methods can be designated for the start point and terminal point of a path, in some cases, or the same modification method needs to be designated for the start point and terminal point, in other cases.

After that, a connection-point information obtaining unit 204 obtains information (to be referred to as "connection-point information" hereafter) representing a modification method at the connection point of the stroke (S307).

Figure 5B:
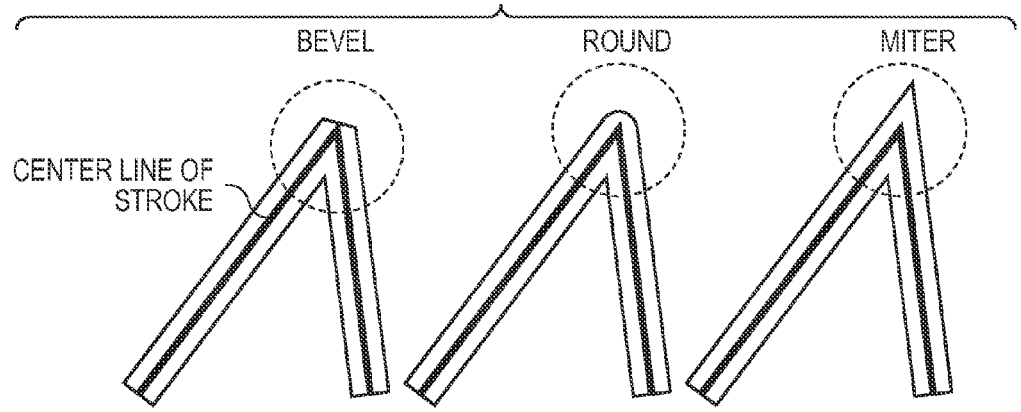
Figure 5C:
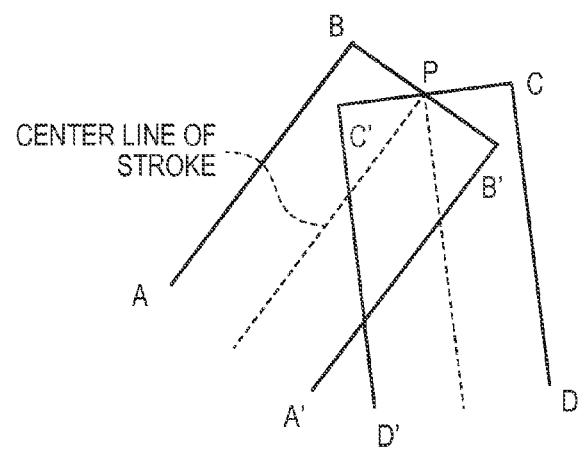

FIG. 5B shows modification methods for the connection point of a stroke. FIG. 5C is an enlarged view showing the vicinity of a connection point. As shown in FIG. 5C, the center lines of two strokes are connected at a point P. When the center lines of the strokes are moved by half the line width in two directions orthogonal to the center lines, line segments AB, A'B', DC, and D'C' are obtained. A connection method between outer points of the outlines of the strokes with respect to the point P, that is, between the points B and C, changes depending on the modification method.

"Bevel" shown in FIG. 5B is a modification method of connecting the points B and C by a line segment. "Round" is a modification method of connecting the points B and C by a shorter circular arc out of circular arcs having the point P as the center, the point B as the start point, and the point C as the terminal point. "Miter" is a modification method of calculating an intersection point Q between an extended line obtained by extending the line segment AB in the direction of the point B, and an extended line obtained by extending the line segment DC in the direction of the point C, and connecting line segments BQ and QC.

The modification method for a connection point can be designated for each connection point, in some cases, and one modification method needs to be designated for one path, in other cases. When the miter is designated and the angle formed by strokes at a connection point is small, the distal end of the stroke becomes very long. To prevent such an extension of a stroke at the distal end, when the angle formed by strokes is small, processing of changing the modification method to the bevel is sometimes performed.

Then, a stroke stencil generation unit 206 generates stencil data of the stroke in a stencil buffer based on the shape information, line-width information, end-point information, and connection-point information (S308), details of which will be described later. Note that the stencil buffer is allocated in a predetermined area of the RAM 103.

A color buffer change unit 207 changes a color buffer based on the generated stencil data and the color information obtained by the color information obtaining unit 205 (S309), details of which will be described later. The processing for one path then ends. Note that the color buffer is allocated in a predetermined area of the RAM 103.

In the above-described example, a data file stored in the storage unit 105 is loaded into the RAM 103, and various kinds of information are obtained from the RAM 103. However, various kinds of information may be obtained through a UI and the input device 107.

[Stencil Creation Processing]

The stencil data creation processing (S308) will be explained with reference to the flowchart of FIG. 6. Generation of stencil data will be explained with reference to FIGS. 7A to 7G.

A basic-stroke stencil generation unit 2061 generates, as basic stencil data (FIG. 7A), the result of fattening each stroke in a direction (to be referred to as an "orthogonal direction" hereafter) orthogonal to the center line of the stroke (S601 to S603). More specifically, for each stroke, the basic-stroke stencil generation unit 2061 obtains the locus of a line segment having a line width. The locus has a middle point on the center line of the stroke, and extends in the orthogonal direction. The path commands shown in FIG. 11A are constituted by two line segments. Basic stencil data is a union of the insides of rectangles each having the thickness of a line width centered on the line segment.

After that, a connection-point stencil generation unit 2063 determines, for all connection points, whether the angle formed by strokes at a connection point is 180°. If the angle is not 180°, the connection-point stencil generation unit 2063 generates connection-point stencil data, and merges it into the basic stencil data (S604 to S607). When one or both of strokes sharing a connection point have curve commands, tangents at the end points of the curve commands are used to calculate an angle. In an example of path commands shown in FIG. 11C, a line segment and cubic Bezier curve are connected at a connection point (50, 100). It is determined that the angle formed by the line segment and the tangent of the cubic Bezier curve is 180°. Since strokes at a connection point at which the angle is determined to be 180° are continuative, connection-point stencil data generation processing is not executed.

An end-point stencil generation unit 2062 determines which of an open path and a closed path is the path (S608). For example, path commands shown in FIG. 11E represent a closed path having no end point, because the start point and the terminal point are connected by a CLOSE( ) command. For a closed path having no end point, the end-point stencil generation unit 2062 ends the stencil data generation processing without generating end-point stencil data.

If it is determined that the path is a closed path, the end-point stencil generation unit 2062 determines whether the modification method for an end point is the butt (S609). If the butt is designated as the modification method for an end point, no end-point stencil data need be generated, and the end-point stencil generation unit 2062 ends the stencil data generation processing. If a method other than the butt is designated as the modification method for an end point, the end-point stencil generation unit 2062 generates end-point stencil data for the start point and terminal point of the path, and merges the end-point stencil data into the basic stencil data (S610 to S612).

Connection-Point Stencil Generation Unit

Figure 12:
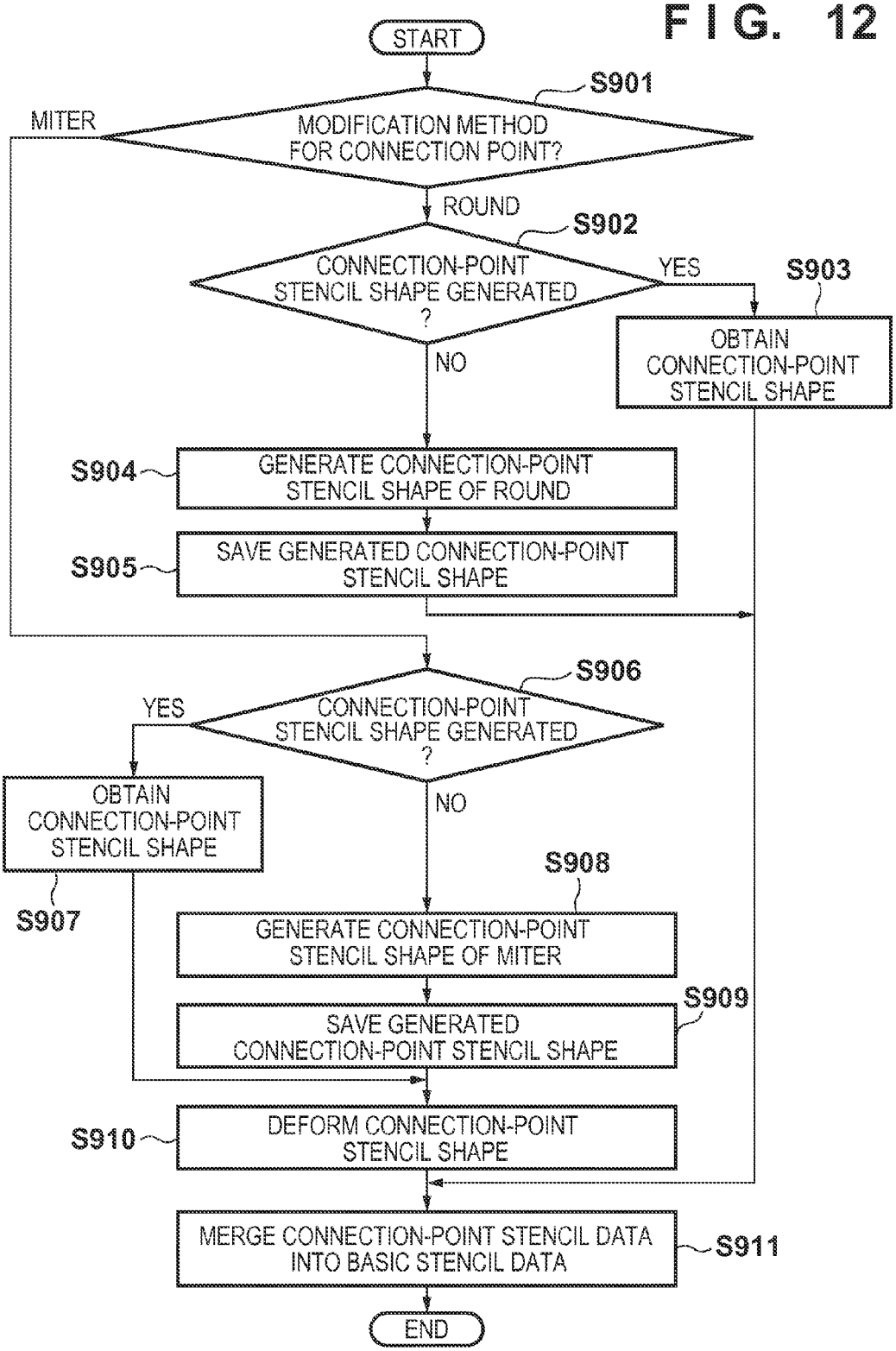
FIG. 12 is a flowchart for explaining details of processing by a connection-point stencil generation unit.

Details of the processing by the connection-point stencil generation unit 2063 will be explained with reference to the flowchart of FIG. 12. Note that FIG. 12 shows processing for each connection point.

The connection-point stencil generation unit 2063 determines a modification method for a connection point of interest (S901). If the modification method is the round, the connection-point stencil generation unit 2063 determines whether the connection-point stencil shape of the round has already been generated and saved in the RAM 103 (S902). If the connection-point stencil shape has already been generated, the connection-point stencil generation unit 2063 obtains the connection-point stencil shape from the RAM 103 (S903), and advances the process to step S911.

If the connection-point stencil shape has not been generated yet, the connection-point stencil generation unit 2063 generates the connection-point stencil shape of the round (S904), saves the generated stencil shape in a predetermined area of the RAM 103 (S905), and advances the process to step S911. At the time of saving, the modification method and the line width of the stroke are associated with the connection-point stencil shape, as generation parameters of the connection-point stencil shape. That is, in step S902, it is determined whether a desired connection-point stencil shape has been saved based on the modification method and the line width of the stroke.

Figure 7A:
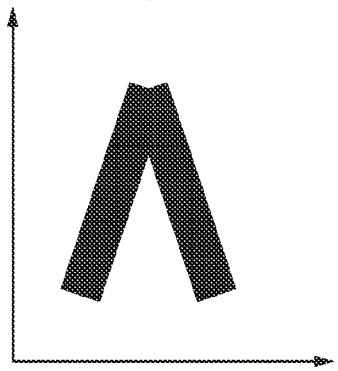
FIGS. 7A to 7G are views for explaining the generation of stencil data.
Figure 7B:
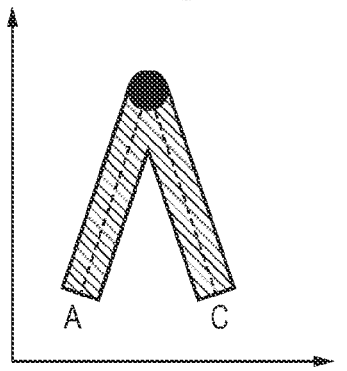

In the path commands shown in FIG. 11A, the coordinates of the connection point exist at one point of (100, 200). When the modification method for a connection point is the round, a circle whose radius is a length corresponding to half the line width is generated, and the inside of the circle is set as a connection-point stencil shape (FIG. 7B). In FIG. 7B, a hatched portion is basic stencil data, and a filled portion is a connection-point stencil shape.

When the round is designated as the modification method for a connection point, the inside of a circle having the same size at all the connection points of one path serves as a connection-point stencil shape. That is, once a circle is generated as a connection-point stencil shape, it suffices to copy this circle at other connection points.

Similarly, even if the modification method is the miter, the connection-point stencil generation unit 2063 determines whether the connection-point stencil shape of the miter has already been generated and saved in the RAM 103 (S906). If the connection-point stencil shape has already been generated, the connection-point stencil generation unit 2063 obtains the connection-point stencil shape from the RAM 103 (S906). If the connection-point stencil shape has not been generated yet, the connection-point stencil generation unit 2063 generates the connection-point stencil shape of the miter (S907), and saves the generated stencil shape in a predetermined area of the RAM 103 in association with generation parameters (S908).

Figure 7C:
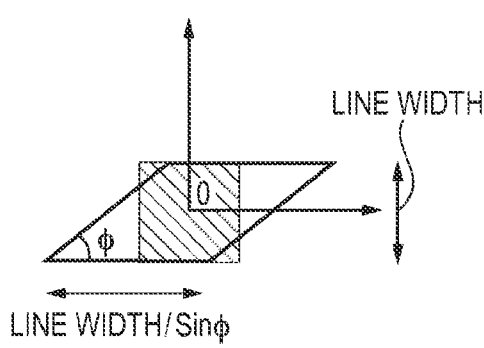

As the connection-point stencil shape of the miter, the connection-point stencil generation unit 2063 generates a square, the length of one side of which is the line width. The sides of the square are parallel to the X- and Y-axes, and the center of the square is the origin of the X- and Y-axes (FIG. 7C). Note that this square is usable at all connection points.

Figure 7D:
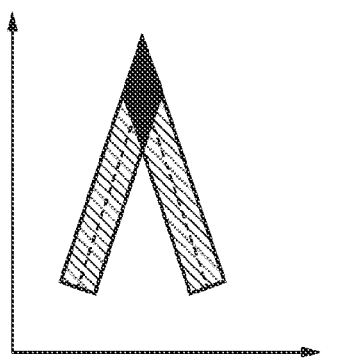

Then, the connection-point stencil generation unit 2063 deforms the connection-point stencil shape (square) in accordance with a connection point (S909). Letting $\phi$ be the angle formed by strokes at a connection point, the square is enlarged by ($1/\sin \phi$) in the X-axis direction, and shear processing is performed at the angle $\phi$ in the horizontal direction (rhombus in FIG. 7C). Further, an angle $\theta$ formed by the line segment AB (see FIG. 5C) with the X-axis is obtained, and the rhombus is rotated by the angle $\theta$. The center of the obtained rhombus is adjusted to the connection point, and the inside of the rhombus is set as a connection-point stencil shape (FIG. 7D).

After the end of obtaining or generating (and deforming) the connection-point stencil shape, the connection-point stencil generation unit 2063 stores, as stencil data in the stencil buffer, a union of the connection-point stencil shape data and basic stencil data (S910). In other words, stencil data is generated by merging the connection-point stencil shape data into the basic stencil data.

End-Point Stencil Generation Unit

In the path commands shown in FIG. 11A, the coordinates of the start point of the path are (50, 50), and those of the terminal point of the path are (150, 50). When the modification method for an end point is the round, modification processing is almost the same as that for a connection point. The end-point stencil generation unit 2062 generates a circle whose radius is a length corresponding to half the line width by using the start point as the center. The end-point stencil generation unit 2062 sets the inside of the circle as end-point stencil data. Similarly, the end-point stencil generation unit 2062 generates a circle whose radius is a length corresponding to half the line width by using the terminal point as the center. The end-point stencil generation unit 2062 sets the inside of the circle as end-point stencil data. Needless to say, when the modification for a connection point includes the round, the connection-point stencil shape that has been generated in step S904 and saved in the RAM 103 in step S905 may be obtained and used as end-point stencil data.

Figure 7E:
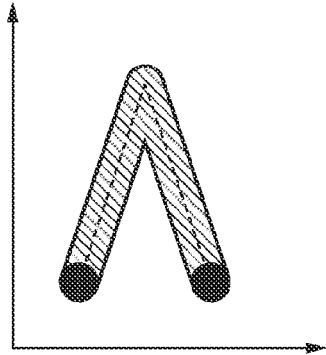
Figure 7F:
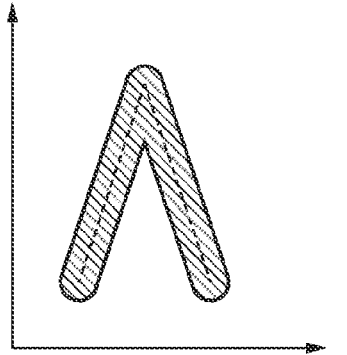

FIG. 7E shows end-point stencil data when an end point is modified by the round. When the generated end-point stencil data is merged into basic stencil data, stencil data shown in FIG. 7F is obtained.

When a path is a composite path formed from a plurality of sub-paths, the same processing is performed at the start point and the terminal point of each sub-path.

Figure 7G:
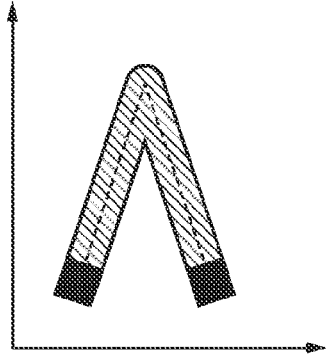

Even when the square is designated as the modification method for an end point, the processing can be performed similarly. The end-point stencil generation unit 2062 generates a square, the length of one side of which is the line width. The sides of the square are parallel to the X- and Y-axes, and the center of the square is the origin of the X- and Y-axes. Then, the square is rotated in accordance with the slope of the stroke at the end point. Further, the square is translated so that the center of the square coincides with the end point. FIG. 7G shows end-point stencil data when the end point is modified by the square.

Another Stencil Creation Processing

In the above-described example, a method of calculating a rectangle by fattening each stroke is used to generate basic stencil data. However, depending on hardware for processing a rendering instruction, the speed is sometimes increased using another method. As this hardware, the graphics accelerator 108, including a graphics processing unit (GPU), is usable.

Figure 9A:
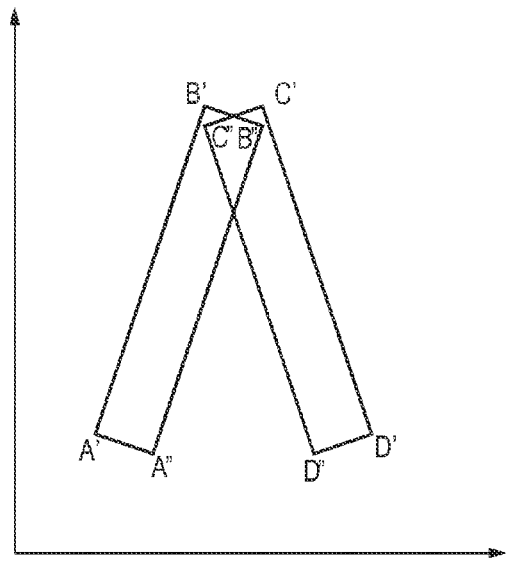
FIGS. 9A and 9B are views for explaining the generation of stencil data.
Figure 9B:
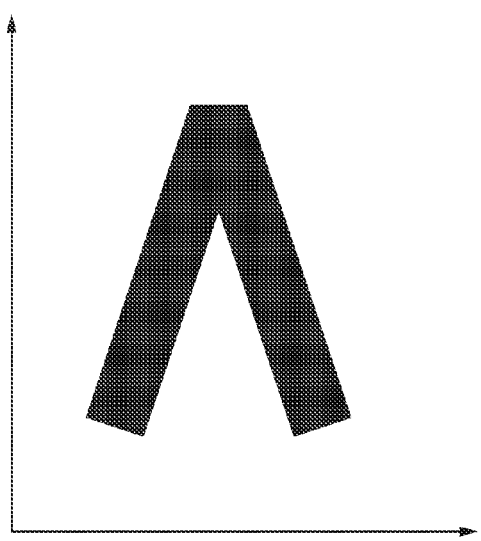

A stencil data generation method using OpenGL® hardware will be explained with reference to the flowchart of FIG. 8. Generation of stencil data will be explained with reference to FIGS. 9A and 9B. Assume that one method can be designated as the modification of a connection point for one path, and one method can be designated as the modification of an end point.

First, the four vertices of a rectangle when a stroke is fattened are obtained for each stroke, and a vertex list in which vertices A', A'', B', B'', C', C'', D', and D'' are aligned in order is created (see FIG. 9A) (S701).

Then, GL_TRIANGLE_STRIP is designated as a rendering mode (S702). This rendering mode is a mode in which, when vertices $V_0, V_1, V_2, V_3, V_4, \ldots, V_n$ are given, the insides of triangles $V_0V_1V_2V, V_2V_3V_4, \ldots, V_{n-2}V_{n-1}V_n$ are filled. As a result, basic stencil data in which modification processing for a connection point is the bevel, and modification processing for an end point is the butt is generated (see FIG. 9B). Note that high-speed rendering processing is possible by the acceleration effect of hardware.

Then, it is determined whether the bevel is designated as the modification method for a connection point (S703). If the bevel is designated, modification data for the connection point has already been generated in basic stencil data, and modification processing for the connection point is skipped, and the process advances to step S704. If a method other than the bevel is designated as the modification method for a connection point, the same modification processing for a connection point (S604 to S607) as that in FIG. 6 is performed, a detailed description of which will not be repeated.

Similarly to the processing in FIG. 6, it is determined which of a closed path and an open path is the path (S608), and it is determined whether the butt is designated as the modification method for an end point (S609). If the path is a closed path having no end point, modification processing for an end point is skipped, and the stencil generation processing ends. If the path is an open path and the butt is designated, modification data for the end point has already been generated in basic stencil data, so modification processing for the end point is skipped, and the stencil generation processing ends. If a method other than the butt is designated as the modification method for an end point, the same modification processing for an end point (S610 to S612) as that in FIG. 6 is performed, a detailed description of which will not be repeated.

When OpenGL® hardware is used, vertex information is stored in the video RAM (VRAM) of the GPU, and the vertex buffer object function is usable. By using this function to arrange stencil shapes at an end point and a connection point, higher-speed processing is expected, while preventing transmission of vertex coordinates from the CPU to the GPU.

[Stencil Buffer and Color Buffer]

Figure 10A:
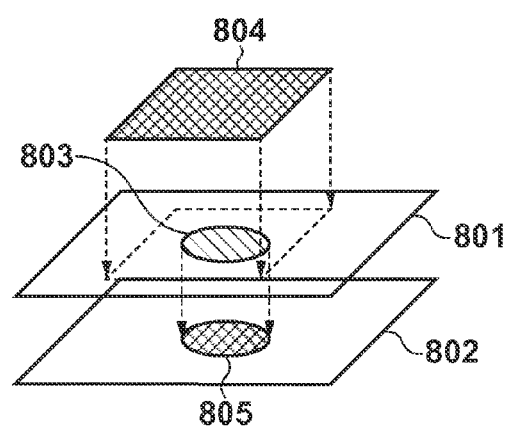
FIGS. 10A and 10B are views schematically showing the relationship between a stencil buffer and a color buffer.
Figure 10B:
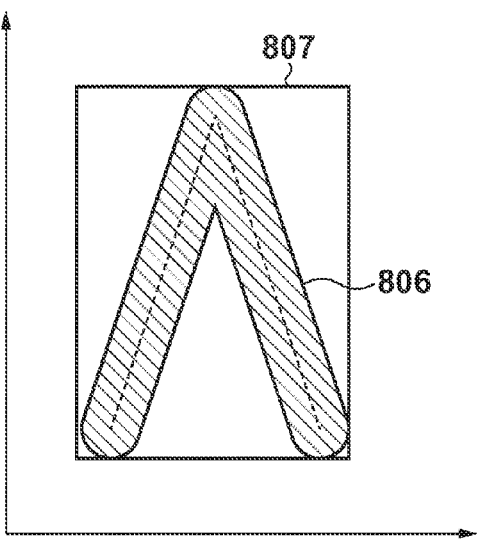

FIGS. 10A and 10B schematically show the relationship between the stencil buffer and the color buffer. A stencil buffer 801 and a color buffer 802 have a one-to-one correspondence for each pixel.

Assume that a stencil area 803 is set in the stencil buffer 801, as shown in FIG. 10A. When a FIG. 804 is generated and rendered, the shape of the FIG. 804 is cut out by the stencil area 803, and the color of pixels of the color buffer 802 that correspond to the cutout shape is changed. Note that the color change algorithm of the color buffer 802 complies with a blend mode designated at that time. When the FIG. 804, including the stencil area 803, is generated, the shape of a stencil-applied FIG. 805, which is reflected in the color buffer 802 coincides with the shape of the stencil area 803.

When a stroke stencil area 806 is set, as shown in FIG. 10B, an inclusive FIG. 807, including the stroke stencil area 806, is calculated and rendered, and a stroke having a modified end point and a connection point, and having a line width can be obtained. When obtained color information represents a single color, if the inclusive FIG. 807 is rendered in this color, a stroke having this color can be rendered in the color buffer 802.

When obtained color information represents a gradation, if the inclusive FIG. 807 having the gradation is calculated and rendered, a stroke having the gradation can be rendered in the color buffer 802. Further, if one image is rendered in the area of the inclusive FIG. 807 or a plurality of images is rendered side by side, a stroke having a pattern or a texture represented by color information can be rendered in the color buffer 802. Note that all of or part of the area of the inclusive FIG. 807 may have transparency indicated by color information.

Affine Transformation

The same processing as that described above is possible, even in stroke rendering accompanied by two-dimensional affine transformation. If shear processing, or the like, is applied in two-dimensional affine transformation, the shape of a fattened stroke may become, not a rectangle, but a parallelogram, and the thickness may not be uniform. If the same two-dimensional affine transformation is applied to a connection-point stencil shape and an end-point stencil shape serving as figures used to generate connection-point stencil data and end-point stencil data in modification processing at a connection point and an end point, the same processing as that described above becomes possible.

Figure 2:
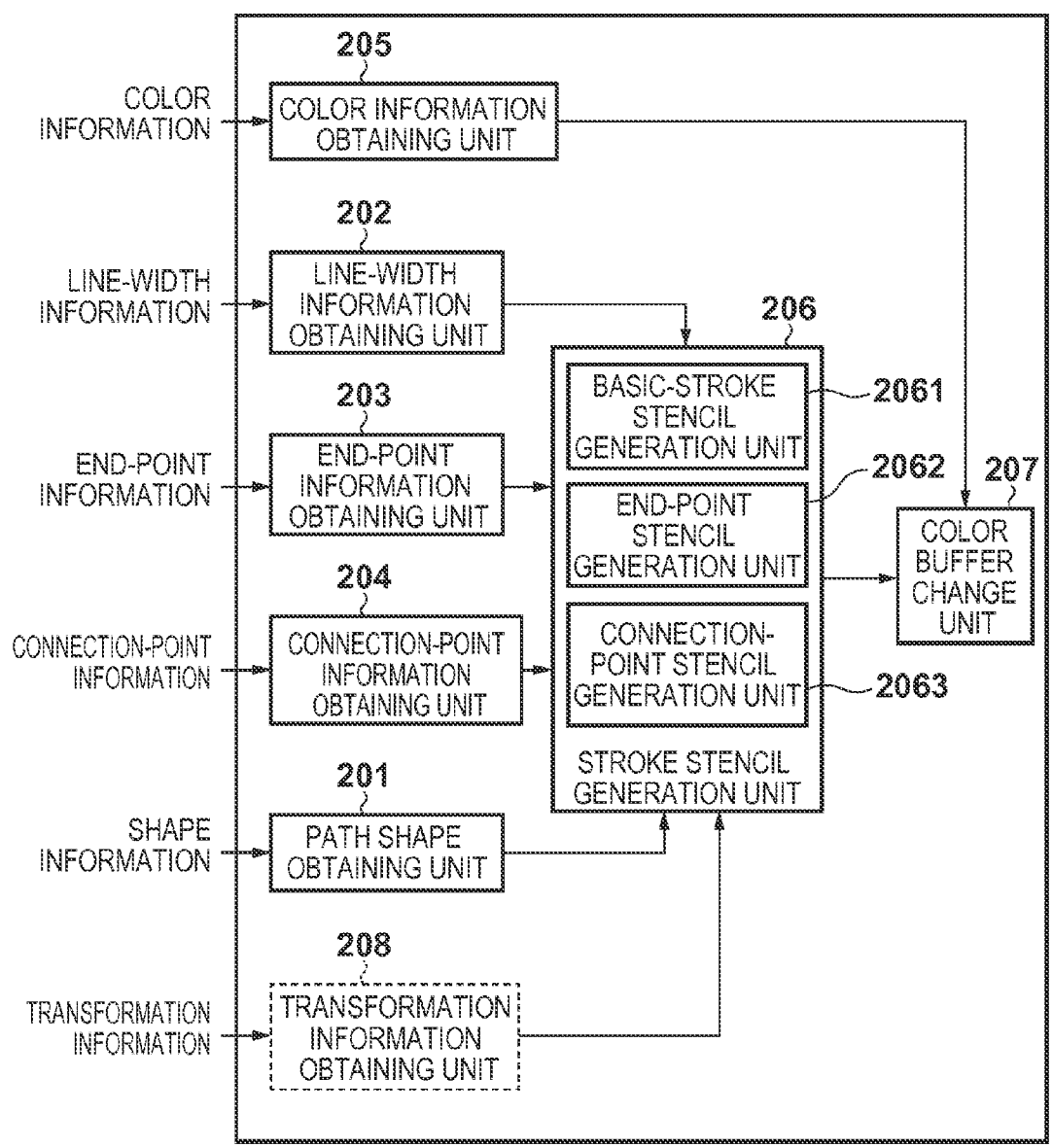
FIG. 2 is a block diagram showing a processing arrangement in vector graphics rendering processing.
Figure 3:
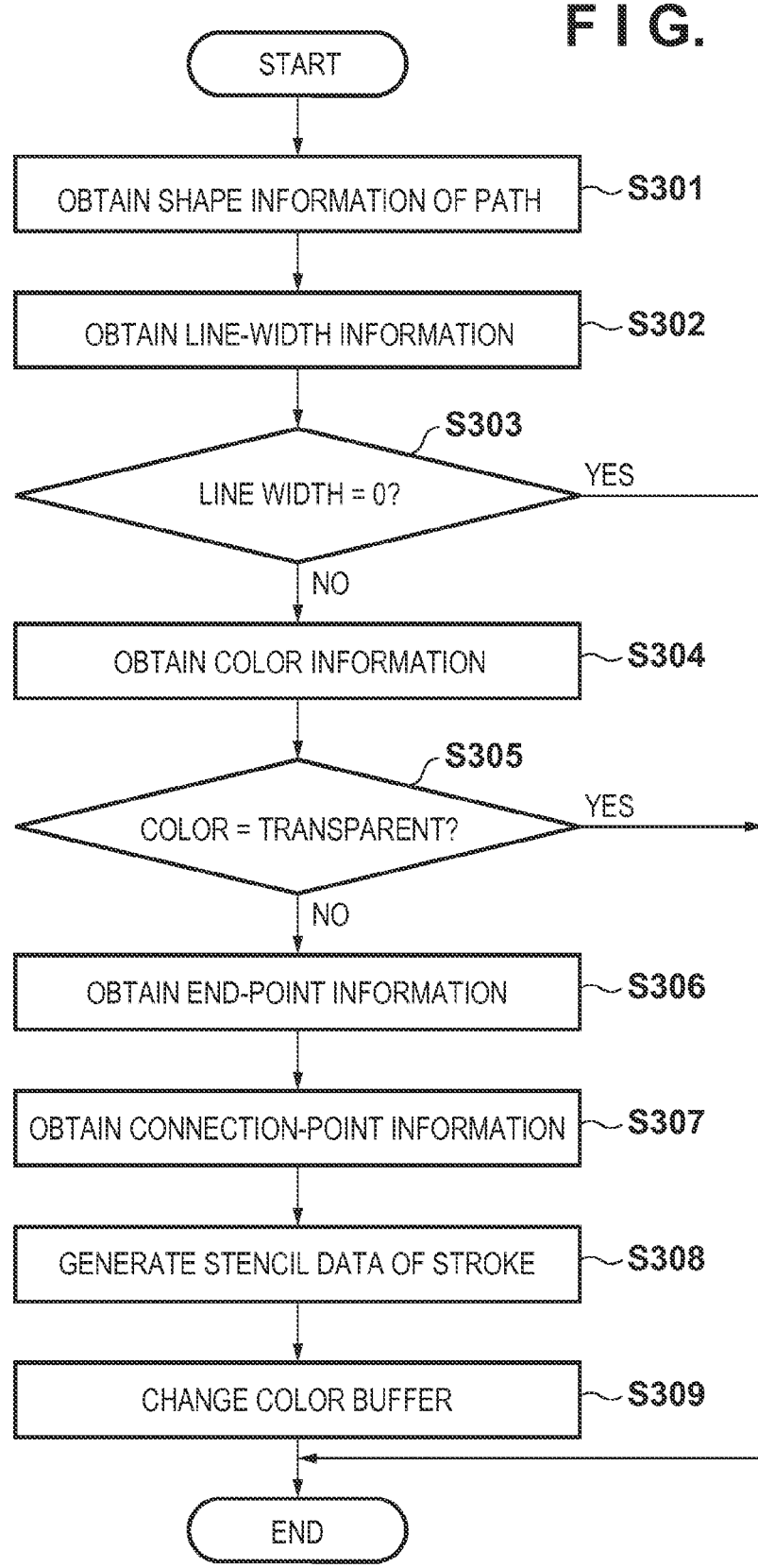
FIG. 3 is a flowchart for explaining vector graphics rendering processing.

In this case, a transformation information obtaining unit 208 shown in FIG. 2 obtains, from the RAM 103, information (to be referred to as "transformation information" hereafter) representing two-dimensional affine transformation. The basic-stroke stencil generation unit 2061 applies, to basic stencil data, the two-dimensional affine transformation based on the transformation information. The connection-point stencil generation unit 2063 applies the two-dimensional affine transformation to a connection-point stencil shape. The end-point stencil generation unit 2062 applies the two-dimensional affine transformation to an end-point stencil shape. Accordingly, stencil data of a stroke accompanied by two-dimensional affine transformation can be created in the same manner as that described above.

Especially, when the round is designated as the modification method for a connection point or an end point, a circle whose radius is a length corresponding to half the line width undergoes two-dimensional affine transformation to generate an ellipse, and this ellipse is arranged at an end point or a connection point, thereby generating stencil data of the connection point or the end point.

Processing of generating stencil data of a stroke accompanied by two-dimensional affine transformation will be explained with reference to FIGS. 13A to 13E.

FIG. 13A shows a path 1001 formed by line segments and a cubic Bezier curve. FIG. 13B shows path commands corresponding to the path 1001. Based on the path commands, basic stencil data 1002 shown in FIG. 13C is generated. In the basic stencil data 1002, the modification method for a connection point is the bevel, and the modification method for an end point is the butt.

When a shear deformation at −20° in the X-axis direction is applied to the basic stencil data 1002 shown in FIG. 13C, deformed stencil data 1003 shown in FIG. 13D is generated from the basic stencil data 1002. In the deformed stencil data 1003, the line width becomes nonuniform as a result of the shear deformation.

When the modification method for a connection point and the modification method for an end point are the round, a circle whose radius is a length corresponding to half of the line width is generated, and the inside of the circle is saved as a stencil shape in the RAM 103. Then, this stencil shape is arranged at connection points and end points, as shown in FIG. 13E, and a union of the stencil shape and deformed stencil data 1003 is calculated. Hence, even when affine deformation accompanies stencil data, final stencil data can be generated. In FIG. 13E, filled portions represent the stencil shape.

Modification of Embodiment

Although line segment commands have been explained above as path commands, the above-described processing is applicable even to a path including curve commands.

In the path commands shown in FIG. 11C, line segment commands and a curve command coexist, as shown in FIG. 11D. For a curve, basic stencil data can be generated by fattening the curve to be as thick as the line width in a direction perpendicular to the tangent of the curve in step S602 of FIG. 6. Alternatively, basic stencil data can be generated by creating a figure having four vertices when the curve is fattened. In this figure, a side (line segment) exists between two vertices sandwiching a path, and a side, arc, or two- or higher-order curve exists between two vertices in a direction along a path.

The processes in steps S302 and S303 of FIG. 3 to obtain a line width and to determine whether the line width is 0 may be omitted. If the line width is 0, stencil data of a stroke generated in step S308 becomes blank, and as a result, this stroke is not rendered.

The process in step S305 of FIG. 3 to determine whether the color is transparent may be omitted. When changing the color buffer (S309), if the color is transparent, the process ends without changing the color buffer before composition.

In this manner, a stroke having a modified connection point and an end point can be rendered quickly.

Other Embodiment

Embodiments of the present invention can also be realized by a computer of a system or an apparatus that reads out and executes computer executable instructions recorded on a storage medium (e.g., a non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus for rendering a stroke formed by paths, the apparatus comprising:
   (a) a first obtaining unit configured to obtain shape information representing a shape of a path;
   (b) a second obtaining unit configured to obtain end-point information representing a modification method for an end point of the stroke;
   (c) a third obtaining unit configured to obtain line-width information representing a line-width of the stroke; and
   (d) a generation unit configured to generate stencil data of the stroke based on the shape information, the line-width information, and the end-point information, wherein the generation unit comprises:
      (i) a first generator configured to generate basic stencil data by fattening the path represented by the shape information based on the line-width information; and
      (ii) a second generator configured to generate end-point stencil data based on the end-point information,
   wherein the generation unit merges the end-point stencil data into the basic stencil data in the generation of the stencil data, wherein the end-point information represents one of a butt, a square, and a round as the modification method for the end point, wherein the first generator creates a figure having four vertices with respect to each of the paths forming the stroke based on the shape information and the line-width information, and fills an inside of the figure to generate basic stencil data in which the modification method for the end point is the butt, wherein, in a case when the end-point information represents a modification method other than the butt, the second generator generates end-point stencil data based on the end-point information, and merges the end-point stencil data into the basic stencil data, and wherein at least one of the first obtaining unit, the second obtaining unit, the third obtaining unit, and the generation unit is implemented using a processor.

2. The apparatus according to claim 1, further comprising a fourth obtaining unit configured to obtain connection-point information representing a modification method for a connection point of the stroke, wherein the generation unit further comprises a third generator configured to generate connection-point stencil data based on the connection-point information, wherein the generation unit generates the stencil data by merging the basic stencil data, the connection-point stencil data, and the end-point stencil data, wherein the connection-point information represents one of a bevel, a miter, and a round as the modification method for the connection point, wherein the first generator fills an inside of the created figure to generate the basic stencil data in which the modification method for the connection point is the bevel, and wherein, in a case when the connection-point information represents a modification method other than the bevel, the third generator generates connection-point stencil data based on the connection-point information, and merges the connection-point stencil data into the basic stencil data.

3. The apparatus according to claim 1, wherein, in a case where the line-width information represents zero, the generation unit does not generate the stencil data.

4. The apparatus according to claim 1, further comprising:
(e) a fourth obtaining unit configured to obtain color information representing a color of a stroke; and
(f) a change unit configured to change a color of a pixel of a color buffer based on the stencil data and the color information.

5. The apparatus according to claim 4, wherein the color information represents at least one of a single color, a gradation, a pattern, a texture, and a transparency.

6. An image processing apparatus for rendering a stroke formed by a plurality of paths, the apparatus comprising:
(a) a first obtaining unit configured to obtain shape information representing a shape of a path;
(b) a second obtaining unit configured to obtain connection-point information representing a modification method for a connection point of the stroke;
(c) a third obtaining unit configured to obtain line-width information representing a line width of the stroke; and
(d) a generation unit configured to generate stencil data of the stroke based on the shape information, the connection-point information, and the line-width information, wherein the generation unit comprises:

(i) a first generator configured to generate basic stencil data by fattening the path represented by the shape information based on the line-width information; and
(ii) a second generator configured to generate connection-point stencil data based on the connection-point information, wherein the generation unit merges the connection-point stencil data into the basic stencil data in the generation of the stencil data, wherein the connection-point information represents one of a bevel, a miter, and a round as the modification method for the connection point, wherein the first generator creates a figure having four vertices with respect to each of the plurality of paths based on the shape information and the line-width information, and fills an inside of the figure to generate basic stencil data in which the modification method for the connection point is the bevel, wherein, in a case when the connection-point information represents a modification method other than the bevel, the second generator generates connection-point stencil data based on the connection-point information, and merges the connection-point stencil data into the basic stencil data, and wherein at least one of the first obtaining unit, the second obtaining unit, the third obtaining unit, and the generation unit is implemented using a processor.

7. The apparatus according to claim 6, wherein, in a case when an angle formed by two strokes sharing a connection point is one hundred eighty degrees, the second generator does not generate connection-point stencil data of the connection point.

8. The apparatus according to claim 6, wherein, for a closed path in which a start point and a terminal point of a stroke coincide with each other, the second generator generates the connection-point stencil data using the start point and the terminal point as connection points.

9. An image processing apparatus for rendering a stroke formed by a plurality of paths, the apparatus comprising:
(a) a first obtaining unit configured to obtain shape information representing a shape of a path;
(b) a second obtaining unit configured to obtain end-point information representing a modification method for an end point of the stroke;
(c) a third obtaining unit configured to obtain connection-point information representing a modification method for a connection point of the stroke;
(d) a fourth obtaining unit configured to obtain line-width information representing a line width of the stroke;
(e) a generation unit configured to generate stencil data of the stroke based on the line-width information, the shape information, the connection-point information, and the end-point information; and
(f) a fifth obtaining unit configured to obtain transformation information of two-dimensional affine transformation to be performed on a stroke, wherein the generation unit comprises:
(i) a first generator configured to generate basic stencil data by fattening the path represented by the shape information based on the line-width information;
(ii) a second generator configured to generate connection-point stencil data based on the connection-point information; and
(iii) a third generator configured to generate end-point stencil data based on the end-point information, wherein the generation unit generates the stencil data by merging the basic stencil data, the connection-point stencil data, and the end-point stencil data, wherein, based on the transformation information, the first generator performs the two-dimensional affine transformation on the basic stencil data, the second generator performs the two-dimensional affine transformation on the connection-point stencil data, and the third generator performs the two-dimensional affine transformation on the end-point stencil data, and wherein at least one of the first obtaining unit, the second obtaining unit, the third obtaining unit, the fourth obtaining unit, the fifth obtaining unit, and the generation unit is implemented using a processor.

10. The apparatus according to claim 9, further comprising:
(g) a sixth obtaining unit configured to obtain color information representing a color of a stroke; and
(h) a change unit configured to change a color of a pixel of a color buffer based on the stencil data and the color information.

11. The apparatus according to claim 10, wherein the color information represents at least one of a single color, a gradation, a pattern, a texture, and a transparency.

12. The apparatus according to claim 9, wherein the connection-point information represents one of a bevel, a miter, and a round as the modification method for the connection point.

13. The apparatus according to claim 9, wherein the end-point information represents one of a butt, a square, and a round as the modification method for the end point.

14. An image processing method of rendering a stroke formed by paths, the method comprising:
using a processor to perform steps of:
(a) obtaining shape information representing a shape of a path;
(b) obtaining end-point information representing a modification method for an end point of the stroke;
(c) obtaining line-width information representing a line-width of the stroke; and
(d) generating stencil data of the stroke based on the shape information, the line-width information, and the end-point information,
wherein the generating step comprises:
(i) a first generating step of generating basic stencil data by fattening the path represented by the shape information based on the line-width information; and
(ii) a second generating step of generating end-point stencil data based on the end-point information,
wherein the end-point stencil data is merged into the basic stencil data in the generation of the stencil data,
wherein the end-point information represents one of a butt, a square, and a round as the modification method for the end point,
wherein, in the first generating step, a figure having four vertices with respect to each of the paths forming the stroke is created based on the shape information and the line-width information, and an inside of the figure is filled to generate basic stencil data in which the modification method for the end point is the butt,
wherein, in a case when the end-point information represents a modification method other than the butt, in the second generating step, end-point stencil data is generated based on the end-point information, and the end-point stencil data is merged into the basic stencil data.

15. A non-transitory computer readable storage medium storing a computer-executable program for causing a computer to perform the method according to claim 14.

16. An image processing method of rendering a stroke formed by a plurality of paths, the method comprising:
using a processor to perform steps of:
(a) obtaining shape information representing a shape of a path;
(b) obtaining connection-point information representing a modification method for a connection point of the stroke;
(c) obtaining line-width information representing a line width of the stroke; and
(d) generating stencil data of the stroke based on the shape information, the connection-point information, and the line-width information, wherein the generating step comprises:
(i) a first generating step of generating basic stencil data by fattening the path represented by the shape information based on the line-width information; and
(ii) a second generating step of generating connection-point stencil data based on the connection-point information,
wherein the connection-point stencil data is merged into the basic stencil data in the generation of the stencil data,
wherein the connection-point information represents one of a bevel, a miter, and a round as the modification method for the connection point,
wherein, in the first generating step, a figure having four vertices with respect to each of the plurality of paths is created based on the shape information and the line-width information, and fills an inside of the figure to generate basic stencil data in which the modification method for the connection point is the bevel,
wherein, in a case when the connection-point information represents a modification method other than the bevel, in the second generating step, connection-point stencil data is generated based on the connection-point information, and the connection-point stencil data is merged into the basic stencil data.

17. A non-transitory computer readable storage medium storing a computer-executable program for causing a computer to perform the method according to claim 16.

18. An image processing method of rendering a stroke formed by a plurality of paths, the method comprising:
using a processor to perform steps of:
(a) obtaining shape information representing a shape of a path;
(b) obtaining end-point information representing a modification method for an end point of the stroke;
(c) obtaining connection-point information representing a modification method for a connection point of the stroke;
(d) obtaining line-width information representing a line width of the stroke;
(e) generating stencil data of the stroke based on the line-width information, the shape information, the connection-point information, and the end-point information; and
(f) obtaining transformation information of two-dimensional affine transformation to be performed on a stroke,
wherein the generating step comprises:
(i) a first generating step of generating basic stencil data by fattening the path represented by the shape information based on the line-width information;

(ii) a second generating step of generating connection-point stencil data based on the connection-point information; and (iii) a third generating step of generating end-point stencil data based on the end-point information, wherein the stencil data is generated by merging the basic stencil data, the connection-point stencil data, and the end-point stencil data, and wherein, based on the transformation information, the two-dimensional affine transformation is performed on the basic stencil data in the first generating step, the two-dimensional affine transformation is performed on the connection-point stencil data in the second generating step, and the two-dimensional affine transformation is performed on the end-point stencil data in the third generating step.

19. A non-transitory computer readable medium storing a computer-executable program for causing a computer to perform the method according to claim 18.

* * * * *